ELECTRONIC TELEPHONE SYSTEM

INVENTORS
ANDERS KARLBY BERGMANN, ANDERS HARALD ELLDIN,
ANTON CHRISTIAN JACOBAEUS, CARL GUNNAR SVALA,
GUNNAR EMIL WELANDER
BY Hane and Nydick
ATTORNEYS May 7, 1963 A. K. BERGMANN ET AL 3,088,998

ELECTRONIC TELEPHONE SYSTEM

Filed May 27, 1959 7 Sheets-Sheet 2

INVENTORS
ANDERS KARLBY BERGMANN, ANDERS HARALD ELLDIN,
ANTON CHRISTIAN JACOBAEUS, CARL GUNNAR SVALA,
GUNNAR EMIL WELANDER

BY Hane and Nydick
ATTORNEYS

INVENTORS
ANDERS KARLBY BERGMANN, ANDERS HARALD ELLDIN,
ANTON CHRISTIAN JACOBAEUS, CARL GUNNAR SVALA,
GUNNAR EMIL WELANDER
BY Hane and Nydick
ATTORNEYS INVENTORS
ANDERS KARLBY BERGMANN, ANDERS HARALD ELLDIN,
ANTON CHRISTIAN JACOBAEUS, CARL GUNNAR SVALA,
GUNNAR EMIL WELANDER
BY Hane and Nydick
ATTORNEYS

ELECTRONIC TELEPHONE SYSTEM

Filed May 27, 1959 7 Sheets-Sheet 5

INVENTORS
ANDERS KARLBY BERGMANN, ANDERS HARALD ELLDIN,
ANTON CHRISTIAN JACOBAEUS, CARL GUNNAR SVALA,
GUNNAR EMIL WELANDER
BY Hane and Nydick
ATTORNEYS

ELECTRONIC TELEPHONE SYSTEM

INVENTORS
ANDERS KARLBY BERGMANN, ANDERS HARALD ELLDIN,
ANTON CHRISTIAN JACOBAEUS, CARL GUNNAR SVALA,
GUNNAR EMIL WELANDER
BY Hane and Nydick
ATTORNEYS INVENTORS
ANDERS KARLBY BERGMANN
ANDERS HARALD ELLDIN
ANTON CHRISTIAN JACOBAEUS
CARL GUNNAR SVALA
GUNNAR EMIL WELANDER
BY Hane and Nydick
ATTORNEYS 3,088,998

ELECTRONIC TELEPHONE SYSTEM

Anders Karlby Bergmann and Anders Harald Elldin, Hagersten, Anton Christian Jacobaeus, Stockholm, Carl Gunnar Svala, Alvsjo, and Gunnar Emil Welander, Stockholm, Sweden, assignors to Telefonaktiebolaget L M Ericsson, Stockholm, Sweden, a corporation of Sweden Filed May 27, 1959, Ser. No. 816,180
Claims priority, application Sweden May 29, 1958
2 Claims. (Cl. 179—15)

This invention refers to automatic telephone exchanges according to the time multiplex principle and relates particularly to a device for setting up speaking connections between conductors, which transmit each a plurality of and a predetermined maximum number of simultaneous speaking connections. Each telephone exchange comprises an impulse sender common to the entire exchange, which sender is sending regularly repeated trains of short-lived current impulses having said maximum number of pulses in each train, whereby each speaking connection through said conductors includes a current impulse from each train in a sequence of trains. The telephone system furthermore comprises groups of common telephone lines, each conducting only one speaking connection at a time, whereby each line has an individual primary contact controlled by pulses from the common impulse sender, which contact during a call connects the line to a primary conductor common to the group during the intervals of time corresponding to the pulses of the call, and a memory element for controlling the make and break of the contact of the line in time to the time pulses of a speaking connection connected to the line. Furthermore the telephone exchange comprises a marker that points out lines which are to be interconnected, and selects a time pulse train that is free for both the primary conductors corresponding to these lines, and sets the memory elements pertaining to the lines, for interconnection of the lines through the speaking connection corresponding to the time pulse train by simultaneous closing of the contacts of the lines during predetermined intervals of time of the time pulse train.

To interconnect lines pertaining to different groups, a contact with a memory element has hitherto been arranged for each combination of two primary conductors. In a large telephone exchange the number of contacts between the primary conductors thus will be very large. The purpose of this invention is to reduce the number of such contacts. This is achieved according to the invention by arranging secondary conductors which each transmit a plurality of simultaneous speaking connections under control of the same time pulse trains as the primary conductors, and secondary contacts for connecting each particular secondary conductor to whichever primary conductor within a group of primary conductors, and also to a number of other secondary conductors pertaining to other groups of primary conductors, and by means of a memory element for each of said secondary contacts, which element is set by the marker when setting up a speaking connection, and thereafter closes the contact during the intervals of time of the call. When the marker selects a free speaking connection between two lines, it selects simultaneously the necessary secondary conductors for which the time pulse train of the speaking connection is free, whereupon primary and secondary memory elements are set for closing the speaking connection by means of corresponding primary and secondary contacts.

The primary contacts are called A-contacts. The secondary contacts are of two kinds, namely B-contacts that connect a primary conductor, a so-called A-wire, to a secondary conductor, a so-called B-wire, and C-contacts that connect two secondary conductors or B-wires.

The invention will be described below more in detail by means of the attached drawings, FIGS. 1–8.

Figure 8:
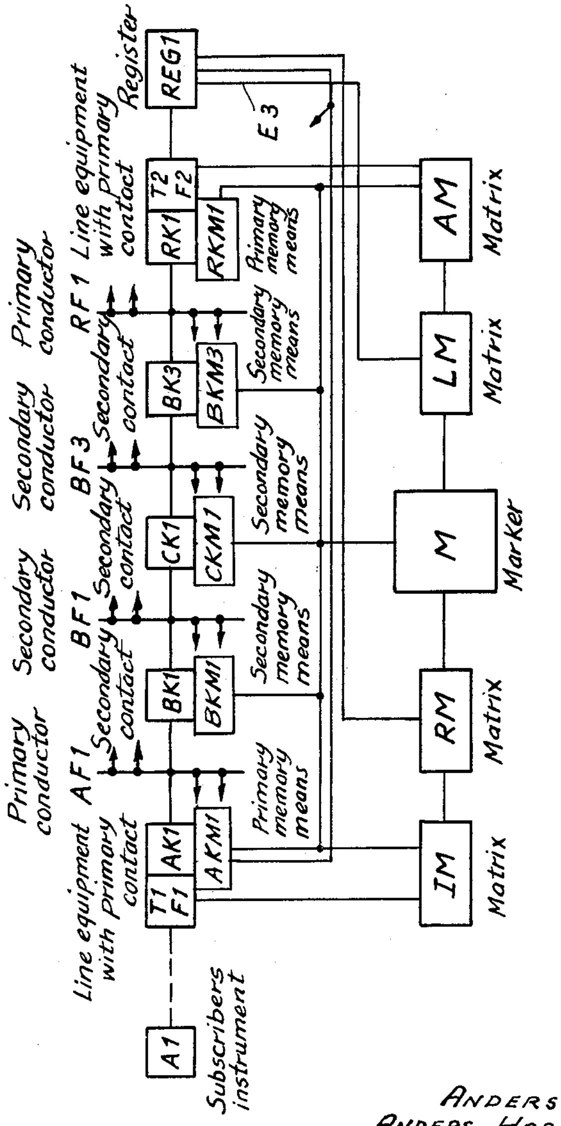
FIG. 8 is a block diagram of the system according to the invention.

The call identifier as well as the register identifier are here regarded as parts of the marker. Referring to FIGURE 8:

A subscriber's station A1 is connected to a subscriber's line equipment T1, F1, AK1. A number of contacts AK1 are connected to the same A-wire AF1, and each A-wire is connectable through contacts, for instance, BK1 to B-wires, for instance, BF1. In the same manner a register REG1 is connected to an equipment T2, F2, RK1. The contact RK1 connects the register REG1 to the A-wire RF1, which through contacts, for instance BK3, is connectable to B-wires, for instance, BF3. The B-wires may be connected together by means of contacts, such as CK1. A matrix with ferrite rings IM is provided for the subscriber's lines, and another ferrite ring matrix is provided for the registers. A comparing matrix RM and LM, respectively, cooperates with each matrix IM and AM. The marker M tests, selects and sets all contacts AK1, BK1, CK1, BK3, RK1 under control of the matrix IM, RM, AM, LM. Each register REG1 is connectable to a multiple E3 and to the matrix RM in order to mark a called line.

Figure 1:
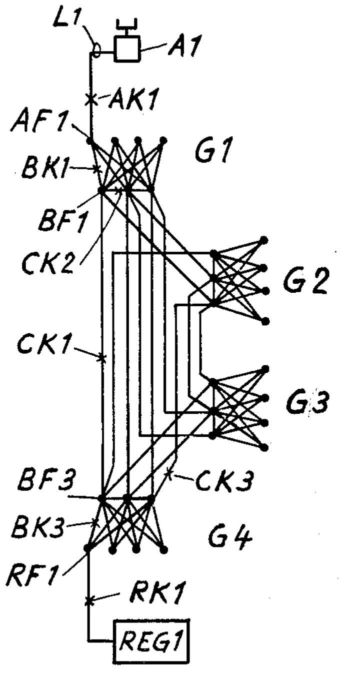
FIG. 1 shows traffic routes and groups of lines and conductors within a telephone exchange.

Turning now to the detailed figures:

In FIG. 1 A1 is a telephone instrument which through a line L1 and an individual primary contact AK1 is connected to a primary conductor AF1. A plurality of other telephone lines are connected in the same way to the conductor AF1. By way of example, one hundred subscribers' lines are connected to the conductor AF1. A number of primary conductors or A-wires, for example four according to FIG. 1, form one group. Four such groups G1–G4 are shown in the figure.

In FIG. 1 there is also shown a register REG1 which by means of an individual primary contact RK1 is connected to a primary conductor RF1. A plurality of registers are connected to the same primary conductor RF1 which in the following will be called register wire. The subscribers' lines may be connected to a register wire and each register wire is an A-wire. To each group pertains a plurality of B-wires, for example three as in the figure.

Within each group G1–G4 each A-wire is connected to each B-wire by means of a secondary contact, for example BK1 and BK3, respectively. The B-wires are interconnected by means of secondary contacts, for example CK1, CK2 and CK3, it being not necessary that all B-wires are connected to other B-wires. The interconnection is dependent on the size of the traffic.

Supposing that each B-wire is by means of secondary C-contacts connected to all other B-wires, the following comparison concerning the need of secondary contacts may be made.

A. If sixteen A-wires are directly interconnected by means of secondary contacts there will be required:

$$\frac{\angle 16}{\angle 2 \cdot \angle 14} = 120 \text{ contacts}$$

B. If twelve B-wires are directly interconnected by means of secondary contacts there will be required:

$$\frac{\angle 12}{\angle 2 \cdot \angle 10} = 66 \text{ contacts}$$

Within each group $3 \cdot 4 = 12$ contacts are added and thus will be totally required: $4 \cdot 12 + 66 = 114$ contacts.

Figure 2:
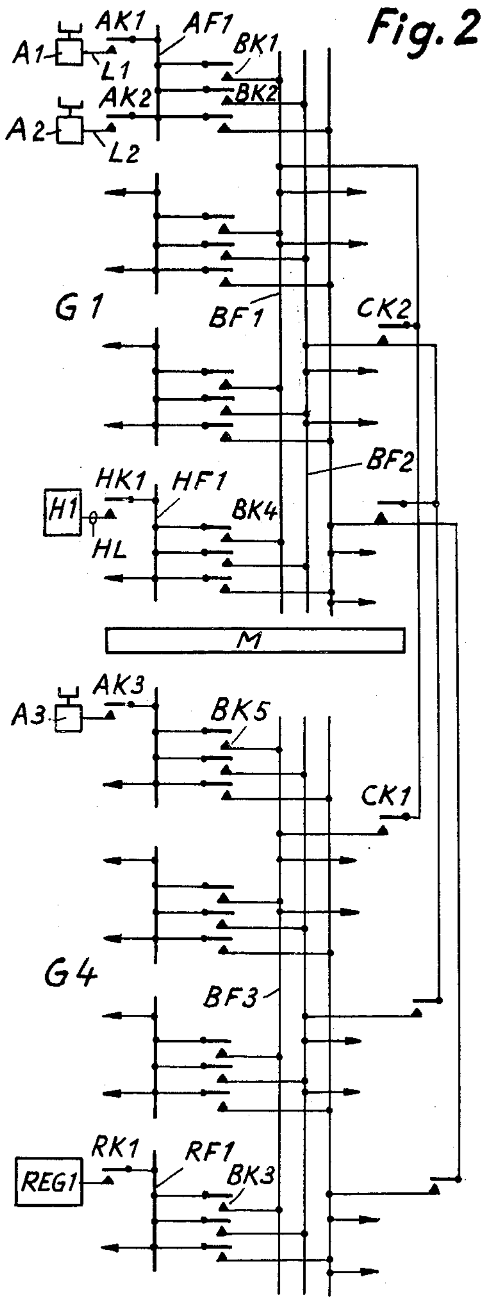
FIG. 2 shows a part of the telephone exchange according to FIG. 1 using other symbolic designations.

In the case A no contact can be saved because it must be possible to connect all subscribers to all other subscribers, while in the case B a considereable decrease of the number of C-contacts may be obtained. According to FIG. 1 totally $21 + 66 = 87$ secondary contacts are required. In larger exchanges the saving is increased. In FIG. 2 two groups G1 and G4 are shown, each comprising four A-wires and three B-wires. In the figure generally accepted symbols are used. Each A-wire is a metallic conductor and three different kinds are shown, namely AF1 which is supposed to comprise only subscribers' lines as L1 and L2, HF1 which is supposed to comprise junction lines HL to other telephone systems, and RF1 which is supposed to comprise registers as REG1. Each subscriber's line has a telephone instrument A1, A2, A3 and an individual contact AK1, AK2, AK3. Each junction line has a line circuit H1 and an individual A-contact HK1. To each register pertains an individual A-contact RK1.

Within each group, each A-wire may be connected to all B-wires by means of secondary contacts as BK1, BK2 . . . BK5. The B-wires within each group may be interconnected by means of secondary C-contacts as CK2. For connection between the groups other C-contacts are provided, for example CK1, CK3.

All contacts AK1–AK3, HK1, RK1, BK1–BK5, CK1–CK3 are controlled from a marker M common to the entire system. For each contact there is provided a memory element comprising a relay line. All delay lines are alike and have the same delay time and can register any desired, in this case suitably twenty, different intervals of time, so-called pulse positions. Each connection within the exchange makes use of one of these twenty pulse positions.

Figure 3:
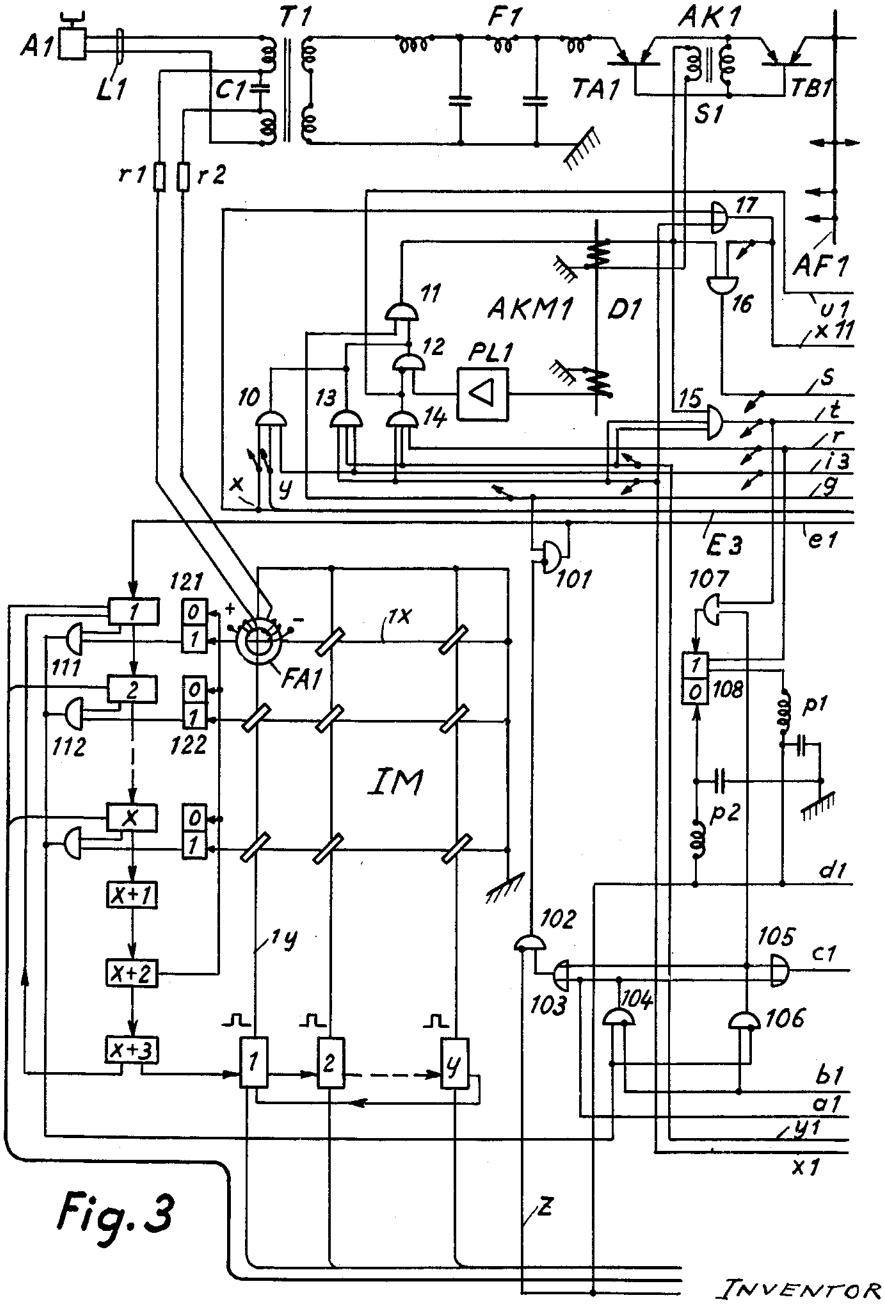
FIG. 3 shows the electronic equipment of a subscriber's line and a first part of a call identifier.

In FIG. 3 a subscriber's instrument A1 is shown which by means of a subscriber's line L1 is connected to a line circuit consisting of a transformer T1, a filter F1 and a contact device AK1. A condenser C1, two resistances *r*1 and *r*2 and a ferrite ring FA1 are also included in the line circuit. The contact device AK1 consists of two transistors TA1 and TB1 and a transformer S1. The contact AK1 is associated with a memory element or memory AKM1 consisting of a delay line D1, an amplifier PL1, an or-circuit 17 and a number of and-circuits 10, 11, 13–16 and a not-circuit 12. The contact AK1 connects the line L1 with the A-wire AF1.

The ferrite ring is an integral part of a matrix IM containing *x* horizontal and *y* vertical rows. The matrix IM pertains to a call identifier in the marker of the telephone system and is combined with a reading device consisting of a first chain with $x+3$ stages, each provided with an electronic circuit. The stepping circuits in the figure form a vertical row and are designated by 1, 2 . . . *x*, $x+1$, $x+2$, $x+3$. There are furthermore *x* and-circuits 111, 112 . . . and *x* bistable circuits 121, 122 . . . and a second chain with *y*-stepping circuits which in the figure form a horizontal row and are designated by 1, 2 . . . *y*. The call identifier includes furthermore and-circuits 107, the not-circuits 101, 102, 104 and 106, the or-circuits 103 and 105, the bistable circuit 108 and two delays *p*1 and *p*2, each consisting of a coil and a condenser.

Figure 4:
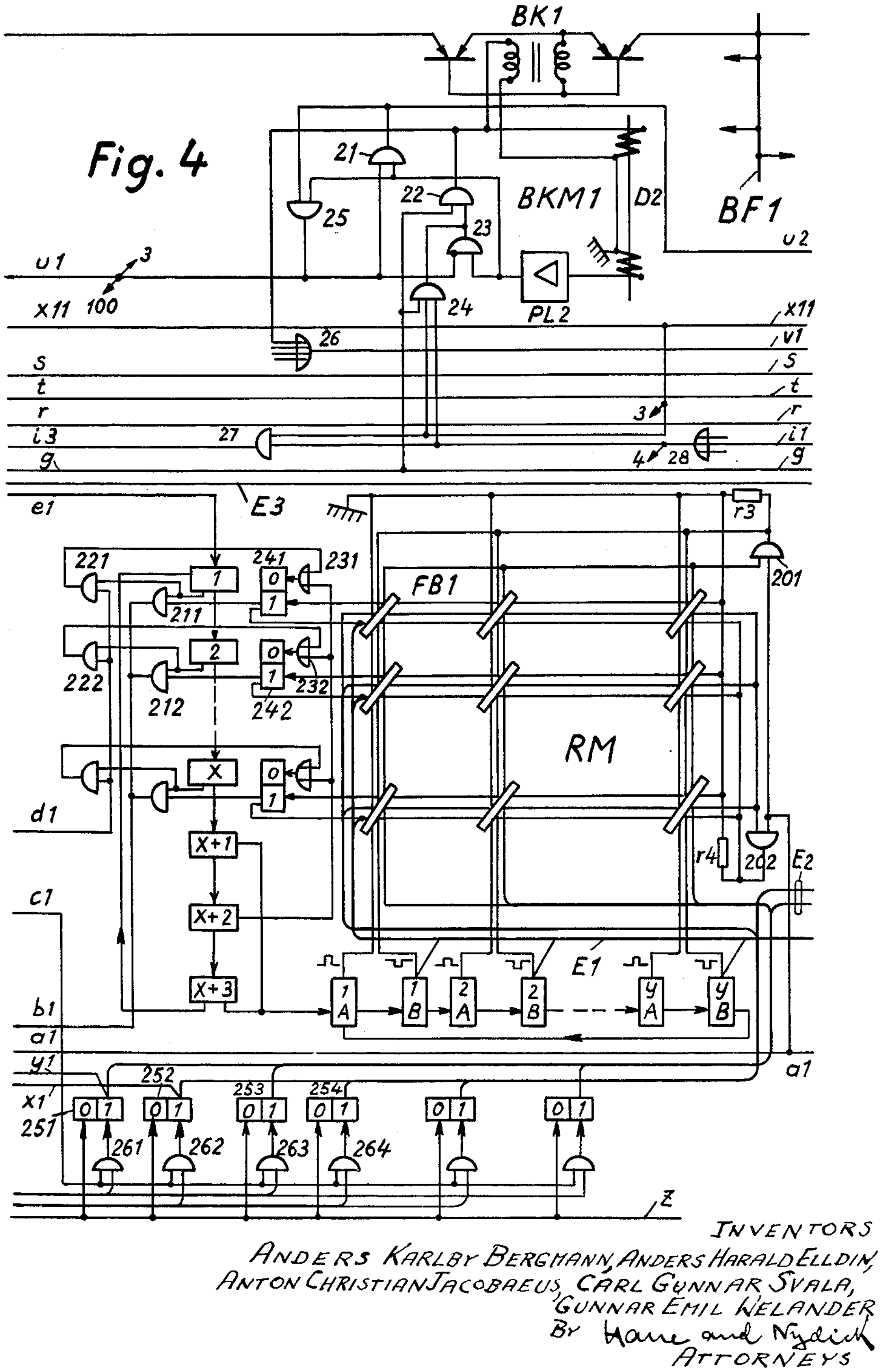
FIG. 4 shows a first secondary contact and a second part of the call identifier.

In FIG. 4 there is shown a secondary contact BK1 with a memory BKM1 consisting of a delay line D2 and an amplifier PL2 and the and-circuits 21, 22, 24, 25 and the not-circuit 23. The contact BK1, like AK1 in FIG. 3, consists of two transistors and one transformer. An or-circuit 26 for selection of a free pulse position and an and-circuit 27 and an or-circuit 28 for setting up communications are also shown.

Below in the figure there is about a matrix with $x \cdot y$ ferrite rings. Each subscriber's line has a ferrite ring, for example FB1 for the subscriber A1 in the matrix RM, as in the matrix IM. For reading out the matrix, there is provided a vertical chain with $x+3$ stepping circuits designated by 1, 2 . . . *x*, $x+1$, $x+2$, $x+3$, and a horizontal chain with 2 *y* stepping circuits designated by 1A, 1B, 2A, 2B . . . *y*A, *y*B. For each *x*-stage there is found an and-circuit 211, 212 . . . and a bistable circuit 241, 242 . . . intended for the reading out and an and-circuit 221, 222 . . . and an or-circuit 231, 232 . . . intended for starting of the *x*-chain after a reading out. Two and-circuits 201 and 202 and two resistances *r*3 and *r*4 are also pertaining to the matrix. Common to the matrixes IM and RM, there is a memory consisting of $x+y$ bistable circuits 251, 252, 253, 254 . . ., each having an and-circuit 261, 262, 263, 264. . . .

Figure 5:
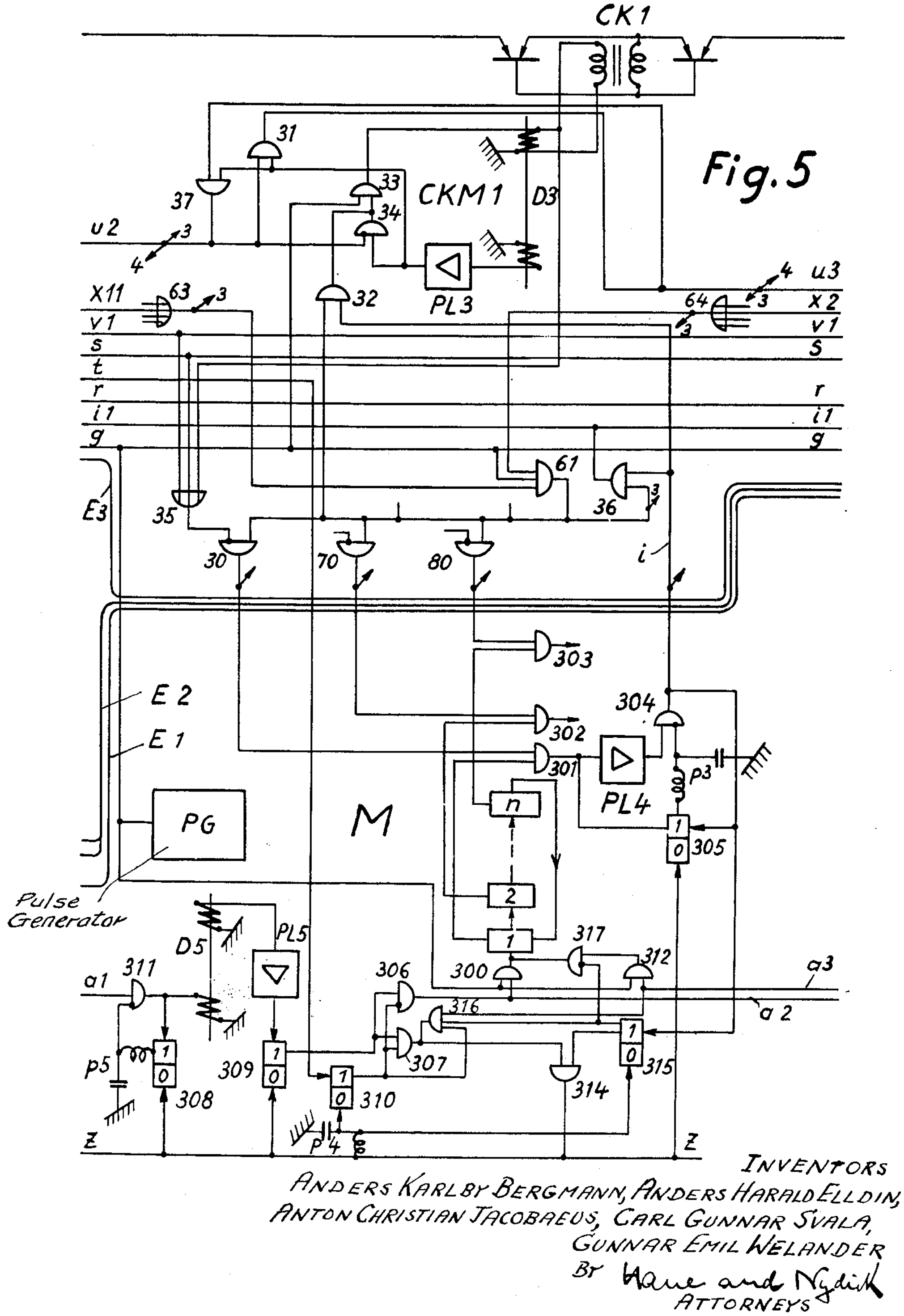
FIG. 5 shows a second secondary contact and a part of a marker.

FIG. 5 shows the secondary contact CK1, in FIGS. 1–2 with its memory CKM1, to which pertain four and-circuits 31–33, 36, 37 an or-circuit 35 and two not-circuits 34 and 30. Furthermore there are shown two or-circuits 63, 64 for setting up connections through the contact CK1. An and-circuit 61 is common to those C-contacts which combine group 1 with group 4. The not-circuits 70 and 80 corresponding to the not-circuit 30 for the other C-contacts are not shown.

Below in FIG. 5, there are shown a selecting device and a control device pertaining to the marker M. The selecting device consists of a stepping chain with *n* stages designated by 1, 2 . . . *n*, and-circuits 300, 301–303, 312, an amplifier PL4, two not-circuits 303, 317 and a bistable circuit 305 and a delay circuit *p*3. The control device consists of a delay line D5 having an amplifier PL5, three bisable circuits 308, 309, 310, an and-circuit 307 and two not-circuits 306, 311 and two delay circuits *p*4 and *p*5. To release the marker M after a connection, there are provided a bistable circuit 315 and two and-circuits 314, 316. In FIG. 5 the impulse sender PG which is common to the whole telephone system is also shown.

The delay line D5 has the same or longer delay time than the delay time of the A-contacts.

Figure 6:
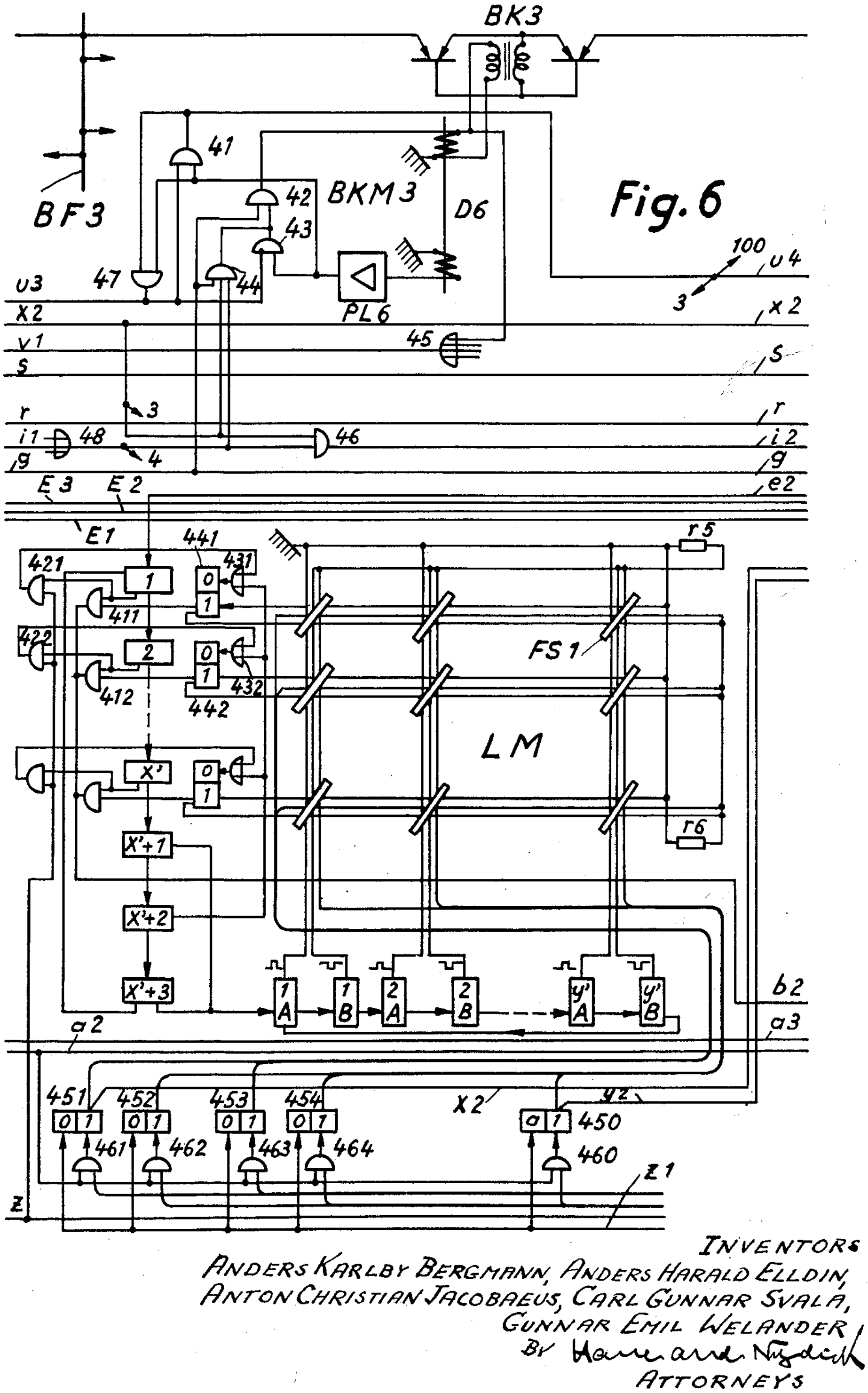
FIG. 6 shows a third secondary contact and one half of a register identifier.

FIG. 6 shows the B-wire BF3 and the secondary contact BK3 with its memory BKM3, to which belong five and-circuits 41, 42, 44, 46, 47, a not-circuit 43 and two or-circuits 45, 48. Below in the figure there is shown a matrix LM comprising $x' \cdot y'$ ferrite rings, for example FS1 for the register REG2, each corresponding to a register. For reading out the matrix LM there is provided a vertical chain with $x'+3$ stepping circuits designated by 1, 2 . . . , $x'$, $x'+2$, $x'+3$ and a horizontal chain with 2 $y'$ stepping circuits designated by 1A, 1B, 2A, 2B . . . $y'$ A, $y'$ B. An and-circuit 411, 412 . . . and a bistable circuit 441, 442 for each stage pertain to the vertical chain. An and-circuit 421, 422 . . . and an or-circuit 431, 432 . . . for each stage and two resistances *r*5, *r*6 also pertain to said vertical chain. FIG. 6 also shows a memory for reading out consisting of $x'+y'$ bistable circuits 451, 452, 453, 454 . . . 450 and $x'+y'$ and-circuits 461, 462, 463, 464 . . . 460.

Figure 7:
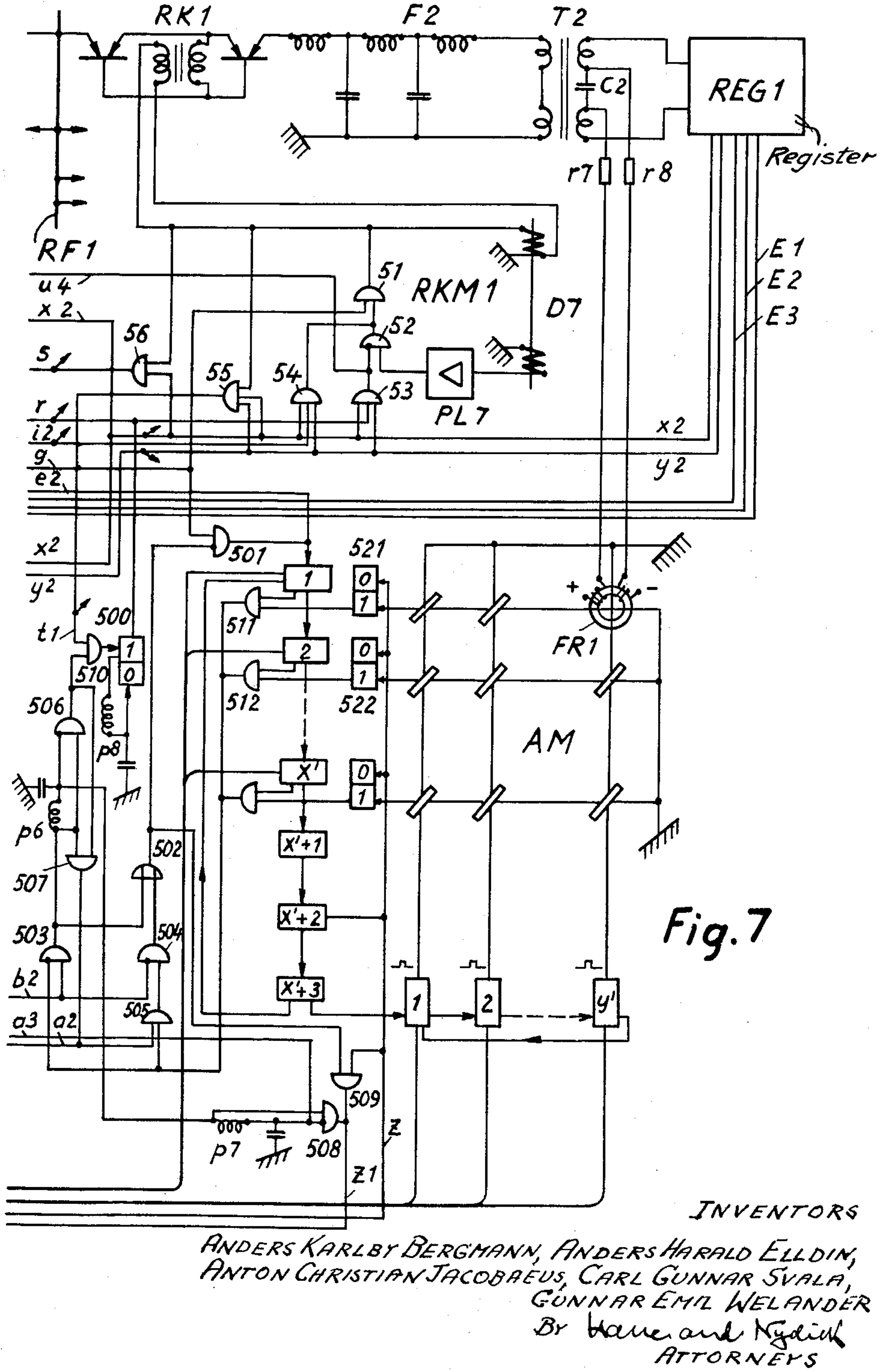
FIG. 7 shows a primary contact and an individual line circuit for a register and the other half of the register identifier.

FIG. 7 shows a register REG 1, the register wire RF1 and the register contact RK1 with its memory RKM1. A filter F2, a transformer T2, a condenser C2, two resistances *r*7, *r*8 and a ferrite ring FR1 pertain to the register. The memory RKM1 comprises a delay line D7, an amplifier PL7, five and-circuits 51, 53–56 and a not-circuit 52.

At the bottom of FIG. 7, there is shown a matrix AM containing $x'+y'$ ferrite rings, for example FR1 for the register REG1. A vertical chain with $x'+3$ stepping circuits and a horizontal chain with $y'$ stepping circuits pertain to the matrix AM. An and-circuit 511, 512 . . . and a bistable circuit 521, 522 . . . pertain to each stage in the vertical chain. In FIG. 7 there are furthermore shown three delays $p6$–$p8$, five not-circuits 501, 503, 504, 506, 508 and four and-circuits 505, 507, 509, 510 and an or-circuit 502 and a bistable circuit 500.

The impulse generator PG drives the chains of the matrixes IM, RM, LM and AM continuously by means of pulses through wires $g$ and $e1$, $e2$, respectively, it thereby being tested when any change occurs in a line or in a register. The pulses pass not-circuits 101 and 501 respectively and drive the vertical chains. The last stage or stages in these chains drive the horizontal chains. The stepping-circuit $(x+3)$ of IM and $(x'+3)$ of AM move the matrixes of the horizontal chains forward one stage upon each closing. The stepping circuit $(x+3)$ of RM and $(x'+3)$ of LM moves the horizontal chains of these matrixes, the $y$-chains, forward one stage upon each closing, whereby an A-circuits in the $y$-chain of the matrix is operated while the circuit $(x+1)$ and $x'+1)$ respectively moves the $y$-chain from an A-circuit to the next following B-circuit. The stepping circuits$(x+2)$ and $(x'+2)$ restore all bistable circuits actuated.

The ferrite cores in the matrixes are normally energized in a certain direction by current impulses from the stepping circuits in the horizontal chains 1, 2 . . . $y$, whereby these current impulses normally will be inoperative.

Upon calls from the subscriber's instrument A1 the devices shown in FIGS. 3–7 co-operate to establish a communication with the register REG1 through two A-wires AF1, RF1, and two B-wires BF1, BF3. The switching process will be described below more in detail.

When the subscriber A1 calls, the following circuit will be completed: +, the link winding of the ferrite ring FA1, the resistance $r1$, the upper winding of the transformer T1, the winding L1, the instrument A1, the lower winding of the transformer T1, the resistance r2, the right winding of FA1, to negative. The ferrite ring FA1 is re-energized, a voltage being induced into the horizontal line $1x$. This voltage is however so directed that it does not affect the stepping circuit 121. When the vertical $x$-chain passes the position $x+3$ and sends an impulse to the stage 1 in the horizontal $y$-chain, a current impulse will be sent out on the vertical wire $1y$, whereby all ferrite cores energized in a certain direction, among others ferrite ring FA1 in the vertical row of the matrix IM, corresponding to the wire $1y$, will be re-energized during the current impulse time and thereafter re-energized again by the corresponding calling circuit, in this case the circuit through L1 and A1. At the first re-energization of the cores during the current impulse time there is induced into the horizontal conductor $1x$ a voltage of a direction such that the bistable circuit 121 is operated and a circuit through the and-circuit 111 is prepared. At the next pulse from the impulse generator the stepping circuit $x+3$ is opened and the stepping circuit 1 is closed, the and-circuit 111 becoming operated. A circuit is closed from the bistable circuit 121, through the circuits 111, 104, 103 and 102 to the not-circuit 101, which breaks the connection between the wires $g$ and $e1$. The chains 1, 2 . . . , $x+3$ in the matrixes IM and RM stop. The following circuit is closed from the bistable circuit 121, the circuits 111 and 104, the wire $a1$, the not-circuit 311, to the write-in winding on the delay line D5 and the bistable circuit 308. The bistable circuit 308 is triggered and closed by means of the delay circuit $p5$ a circuit to the not-circuit 311, which breaks the current through the wire $a1$ and thus an impulse is sent out on the delay line D5.

At the same time the bistable circuits 251 and 252 in FIG. 4 are triggered by the following procedure. A circuit from the bistable circuit 121 through the circuits 111, 104, 105 and the wire $c1$ prepares the and-circuits 261 and 262. From the stepping circuits 1 in the $y$-chain and $x$-chain, respectively, to the matrix IM connections issue to the and-circuits 261 and 262, respectively, indicating the position of the calling subscriber A1 or coordinates in the matrixes IM and RM. When a voltage is connected to said connections the and-circuits 261 and 262 are opened, the bistable circuits 251 and 252 thereby being operated. A voltage is connected to the wires $x1$, $y1$, whereby the and-circuits 13, 14, 15 and 16 are prepared to receive circuits through the wires $i$, $r$, $t$, $s$.

Wire $t$ is used to test whether any pulse position is stored in the delay line D1 or not, that is, if the subscriber A1 is free or is in communication. In this case the memory AKM1 is empty which means that no current impulse is sent out from AKM1 through the and-circuits 15, through the wire $t$ to the bistable circuit 310 in the marker M, FIG. 5. When the pulse that is sent out on the delay line D5 in FIG. 5 is read out in the read-out winding of D5 by means of the amplifier PL5 the bistable circuit 308 will be operated. As the bistable circuit 310 has not been operated at the call marking, a circuit will be closed from the bistable circuit 309 through the not-circuit 306, through the wire $a2$ to the not-circuit 505.

In the matrixes LM and AM each register has a ferrite ring. The ferrite ring in AM, for example FR1 for the register REG1, is normally energized by means of a circuit through the register. For the register REG1 this circuit passes through the resistances $r1$, $r8$ and the transformer T1. Each time one of the stepping circuits 1 . . .y' is operated by a pulse from the stepping circuit $(x'+3)$ a current impulse is sent through the corresponding vertical conductor. All ferrite rings are energized in the opposite direction relatively to normal and a current impulse is generated in the horizontal conductors, having such a direction that the bistable circuits 521, 522 . . . are triggered. According as the stepping circuits 1,2 . . . $x'$ are connected by means of pulses from the impulse generator PG in FIG. 5 through the wire $g$ and the not-circuit 501, circuits will be closed through the not-circuits 511, 512 . . . to the not-circuit 503 that is closed, and also to the not-circuit 505 that opens if simultaneously a voltage is applied on the wire $a2$, that is, if a call is carried out from one of the subscribers. The not-circuit 504 is closed by means of the wire $b2$, if the marked register is occupied, that is, is recorded in the matrix LM. How this happens will be described below.

Here it is supposed that the register REG1 is free, that the stepping circuit $y'$ is operated by an impulse from the circuit $(x'+3)$ and that the bistable circuit 521 is triggered. When the stepping circuit 1 in the $x'$-chain is operated, a circuit is closed from the bistable circuit 521, through the circuits 511, 505, 504 and 502 to the not-circuit 501 which breaks the connection to the impulse generator PG. The two $x'$-chains of the matrixes LM and AM stop and the coordinates 1 and $y'$ of the ferrite ring FR1 are marked in the and-circuits 461–460 in FIG. 6. As the wire $a2$ is conductive the end-circuits 461 and 460 will be opened and the bistable circuits 451 and 450 are operated. Currents are closed through the wires $x2$, y2 to the and-circuits 53, 54, 55, 56 of the register, which circuits are prepared for signal sending through the wires $i2$, $r$, $s$.

The marker M has now marked the subscriber's instrument A1, and also the register REG1 and a connection between these registers is to be set up. In the matrixes IM and RM the $x$-coordinate indicates an A-wire and the $y$-coordinate a line connected to the A-wire. The wire $x1$ now indicates the A-wire AF1 and the wire $y1$ indicates the instrument A1 that is connected to the wire AF1. In the matrixes LM and AM the $x'$-coordinate indicates an A-wire and the $y'$-coordinate a register that is connected to the A-wire. The wire $x2$ now indicates the register wire RF1 and the wire $y2$ indicates the register REG1 that is connected to the wire RF1. The marker M is to select a connection between the wire AF1 and the wire RF1.

The wire $x1$ indicates (through the or-circuit 17 and the wire $x11$) those three wire contacts, for example BK1, which connect the wire AF1 with one of the B-wires, for example BF1, within the group G1 in FIG. 1. This occurs by marking an input to the and-circuit 24 in FIG. 4 for each one of the three wire contacts. Simultaneously the wire $x2$ indicates those three wire contacts, for example BK3, which connect the wire RF1 with one of the wires, for example BF3, within the group G4. This occurs by marking an input to the and-circuit 44 in FIG. 6 for each one of the three wire contacts. The wire $x11$ and the $x11$-wires of all other A-wires within the group G1 are connected together by means of an or-circuit 63 to a common wire that leads to the and-circuits 61 of all wire contacts, for example CK1, CK2, which connect a B-wire in the group with some other B-wire within or outside the group G1. Likewise the wire $x2$ and the $x$-wires of all other A-wires within the group G4 are interconnected by means of an or-circuit 64 with the and-circuits 61 of all wire contacts, for example CK1, CK3 that connect a B-wire in the group GA with some other B-wire within or outside the group G4. Those C-contacts, CK1 and others which connect a B-wire in group G1 with a B-wire in group G4 are thus indicated through the and-circuit 61 by means of the wires $x1$ and $x2$ and the or-circuits 63, 64. The and-circuit 61 is common to those C-contacts which connect the groups G1 and G4 with each other, and indicates that a connection in the traffic route between G1 and G4 is to be set up.

By means of multiple wires E2 connected to the bistable circuits 251–254 . . . the coordinates $x1$, $y1$ of the calling subscriber A1 are registered in the selected register REG1. This registering is prepared by circuits through the wires $x2$, $y2$ in FIG. 7, corresponding to the coordinates of the register.

When a call was marked by a circuit from the bistable circuit 309 through the not-circuit 306 to the wire $a2$, the and-circuit 300 was opened for pulses from the impulse sender PG whereby a stepping chain with $n$-stepping circuits designated by 1, 2 . . . $n$ in FIG. 5 will start. The chain 1, 2 . . . $n$ selects a free connection by testing those C-contacts which connect the group of the calling line, in this case group 1, with the group of the called line, in this case 4. The number of available C-contacts is according to FIG. 1 maximally three, and thus the number $n$ will be three. The number $n$ must however be selected so that all pulse positions are tested for all C-contacts in question. The contact CK1 is marked through the and-circuit 61, the not-circuit 30 and the and-circuit 301. When 20 pulse positions are supposed to exist here, all the twenty pulse positions will be tested for the contact CK1 after twenty passages of the stepping chain 1, 2 . . . $n$. Simulaneously all the twenty pulse positions will be tested for the two C-contacts that correspond to the circuits 70, 302 and 80, 303. Thus the number twenty is not equally divisible by $n$.

A free connection through the contact CK1 is marked through the or-circuit 35 and the not-circuit 30 by means of pulses on the wires $s$ and $v1$ and pulses from the delay line D3. The wire $v1$ is individual for the contact CK1 and receives from the link side pulses through the or-circuit 26 and from the right side pulses through the or-circuit 45. Through the or-circuit 26 the wire $v1$ receives a pulse for each pulse position that is stored in the memory of one of those B-contacts, BK2 and others, which pertain to the B-wire BF1. Through the or-circuit 45 the wire $v1$ receives a pulse for each pulse position that is stored in the memory of one of those B-contacts, BK3 and others, which pertain to the B-wire BF3. These pulses are sent from respective delay lines D2 and D6, respectively, through the amplifier PL2 and PL6, respectively, the not-circuit 23 and 43 respectively and the and-circuit 22 and 42 respectively and the or-circuits 26 and 45, respectively.

The wire $s$ is common to the whole telephone system and is multiplied to the and-circuit 16 and 56, respectively, of all lines. These and-circuits are closed when the A-wire of the line AF1 and RF1, respectively, is indicated by a voltage in its $x$-coordinate, i.e., the wire $x1$ and $x2$, respectively, during the time intervals of each pulse position stored in the memory of some individual contact connected to the A-wire pointed out, AF1 and RF1, respectively. All busy positions for the A-wires AF1 and RF1 thus block by means of voltage on the wire $s$ the not-circuits 30, 70, 80. All pulse positions for the B-wires BF1 and BF3 are blocked simultaneously by means of voltage on the wire $v1$ in the not-circuits 30, 70, 80. Furthermore the not-circuit 30 blocks all pulse positions that are stored in the mebory CKM1 of the contact CK1. All pulses are synchronized by means of particular wires in the and-circuits 61, 11, 22, 33, 42 and 51, extending from the wire $g$ which is common to the whole telephone system and is connected to the impulse generator PG.

Here it is supposed that the not-circuit 30 is not blocked during the time of a determined impulse that issues from the impulse generator PG, passes the and-circuit 300 and actuates the stepping circuit 1 in the chain 1, 2 . . . $n$. As a result, the and-circuit 301 opens and a current impulse, which is amplified in the amplifier PL4, passes the not-circuit 304 and is sent out on the write-wire $i$ that is common to a plurality of C-contacts. This impulse actuates the bistable circuit 305 which by means of the delay circuit $p3$ closes the not-circuit 304, the duration of the write-impulse thereby being determined.

Storing of a free pulse position for a connection now occurs in the memory of the contact CK1, CKM1, through the and-circuits 32, 33 and the upper winding of the delay line D3, and in the memory elements BKM1 and BKM3 of the contacts BK1 and BK3, respectively, through the and-circuits 24 and 44, respectively and also in the memories AKM1 and RKM1, respectively, of the individual contacts AK1 and RK1 through the and-circuits 13 and 54, respectively. The write-wire $i$ is multiplied to a C-contact for each traffic route between the groups G1, G2, G3, G4. Through the and-circuit 36 the write-impulse passes to the wire $i1$ that is individual for the contact CK1. The wire $i1$ is to the link multiplied to all those B-contacts which connect the B-wire BF1 with one of the A-wires out of the group G1. To make it possible to connect more than one C-contact to the B-wire, an or-circuit 28 is provided. The wire $i1$ is to the right multiplied to all those B-contacts which connect the B-wire FB3 with one of the A-wires in the group G4. To permit the connection of more than one C-contact to the B-wire BF3, an or-circuit 48 is provided.

The write-impulse passes the wire $i1$, the or-circuit 28 and the and-circuits 24 and 22 to the write-winding of the delay line D2 in the memory BKM1 of the contact BK1 which corresponds to the A-wire AF1 and the designated coordinate $x1$. The impulse also passes the and-circuit 27, the wire $i3$, the and-circuits 13 and 11 to the write-winding on the delay line D1 in the memory AKM1 of the individual contact AK1 of the calling line L1. Simultaneously a write-impulse is sent through the wire $i1$, the or-circuit 48 and the and-circuits 44 and 42 to the write-winding on the delay line D6 in the memory BKM3 of the contact BK3 which corresponds to the A-wire RF1 and the designated coordinate $x2$. The impulse also passes the and-circuit 46, the wire $i2$ and the and-circuits 54 and 51 to the write-winding on the delay D7 in the memory RKM1 of the individual contact RK1 in the selected register REG1.

During the operations described hereinabove the coordinates $x1$, $y1$ of the calling subscriber A1 are recorded in the matrix RM and the coordinates $x2$, $y2$ of the selected register REG2 are recorded in the matrix LM. This occurs by means of so-called half-currents. From the bistable circuits 251, 252 two circuits are formed which cross each other in the ferrite ring FB1. The current strength in these circuits is reduced by the resistances *r*3 and *r*4, respectively so that each circuit by itself is not able to re-energize any ferrite ring. Only the ferrite ring which is energized by both circuits is re-energized. In this case the ferrite ring FB1 is re-energized. In the matrix LM the ferrite ring FS1 is re-energized by means of those two circuits which are closed by the bistable circuits 450 and 451 through the resistances *r*5 and *r*6, respectively and which cross each other in the ferrite ring FS1. Then the connection between the subscriber's instrument A1 and the register REG1 is set up and the marker M will be released.

When the write-impulse is received in the memories AKM1 and RKM1, respectively, of the individual contacts AK1 and RK1 the impulse passes the and-circuit 15, the wire *t* and operates the bistable circuit 310. The not-circuit 306 blocks and the impulse chain 1,2 . . . *n* stops. Simultaneously the pulse on the wire *i* triggers the bistable circuit 315 and a circuit is formed from the bistable circuit 310 through the and-circuits 307 and 314 to the wire *z*. All bistable circuits in the marker are restored, namely 251, 252, 308, 309, 305, and through the and-circuit 509 and the wire *z*1 the bistable circuits 451 and 450 also. With some delay in the delay line *p*4 the bistable circuits 310 and 315 are also restored. The signal on the wire *z* will block the and-circuit 102, the *x*-chains of the matrixes IM and AM thereby being started.

The subscriber A1 is now connected to the register REG1 and the coordinates of A1 are recorded in the register REG1, and in the matrix RM while the coordinates of the register are recorded in the matrix LM. The matrix RM works in the following way. Each time the stepping circuit *x*+3 operates a stepping circuit in the horizontal chain of the matrix, for example, the stepping circuit 1A, a current impulse will be sent out on the corresponding vertical conductor, whereby all ferrite rings along the conductors, corresponding to occupied conductors, are re-energized, among them ring FB1. Corresponding bistable circuits are triggered, among them circuit 241. When the stepping circuit 1 is operated during the next following impulse, a circuit is closed through the and-circuit 211 to the wire *b*1 and the not-circuits 104 and 106. The reading out of the matrix IM however occurs synchronously with the reading out of matrix RM, and thus the ferrite ring FA1 is reenergized simultaneously with the ferrite ring FB1, the bistable circuit 121 is triggered, the stepping circuit 1 in the *x*-chain is operated and a circuit through the and-circuit 111 to the not-circuits 104 and 106 is formed simultaneously with the above mentioned circuit through the wire *b*1. Hereby both the two not-circuits 104 and 106 are closed, the *x*-chains of the matrixes do not stop and no alteration occurs. When the *x*-chain of the matrix RM passes the stepping circuit *x*+1, the position of the horizontal chain is moved from stepping circuit 1A to stepping circuit 1B, a new current impulse being sent through all ferrite rings in the vertical row corresponding to stepping circuits 1A, 1B. This occurs by means of half-current, i.e., in series with the resistance *r*3, and thus only ferrite rings corresponding to a horizontal row, the bistable circuit 241, 242 . . . of which is operated, are re-energized. As appears from FIG. 4 each operated bistable circuit 241, 242 . . . closes a circuit by means of half-current through the resistances *r*4. In this way each position that is read-out in an A-position, is again stored in the matrix RM in the pertaining B-position. When the *x*-chains reach the last but one position *x*+2, all bistable circuits 121, 122 . . ., 241, 242 . . . are restored. In the position *x*+3 in the matrix RM the horizontal chains move from stepping position 1B to stepping position 2A and the operation is repeated with the vertical row of ferrite rings corresponding to the stepping circuit 2A. The matrix LM works substantially in the same manner as the matrix RM. The bistable circuits 521, 522 . . . of the matrix AM are operated, as is described above, for each reading out that corresponds to a not calling register. The reading out is, however, blocked by the and-circuit 505 if no call is marked by voltage on the wire *a*2. At the same time the not-circuit 503 is blocked. In the matrix LM each occupied register is read out. The ferrite ring FS1, for example, is re-energized at each pulse from the stepping circuit *y*′ A and triggers the bistable circuit 441. When the stepping circuit 1 in the *x*′-chain is operated, a signal is sent through the and-circuit 411 to the wire *b*2 and the not-circuits 503 and 504. The not-circuit 503 is closed by a simultaneous signal from the matrix AM and the not-circuit 504 is closed by busy designation in case a call should be effected by a subscriber, so that the and-circuit 505 is opened. No signal reaches the not-circuit 501 so that the *x*′-chain stops, unless a call is carried out and a free register is read out.

The principles for setting up connections through A-files and B-files are now described and the other procedures of setting up communications between subscribers' lines will be described only in part. The principle of disconnecting a connection will be described first. It is supposed that the subscriber, after having been connected to a register, abandons the connection and replaces his hand set. The circuit through the resistances *r*1, *r*2 for energizing the ferrite ring FA1 is broken. At the next reading out the ferrite ring FA2 is re-energized without being thereafter restored to its earlier magnetic condition. Thus, at a second readnig out the bistable circuit 241 is not triggered. The not-circuit 106 is not blocked and the signal through the wire *b*1 from the matrix RM passes the or-circuit 105 to the wire *c*1, the and-circuits 261, 261 and the bistable circuits 251, 252. The coordinates *x*1, *y*1 are indicated, among other things, in the and-circuit 15. The memory AKM1 sends out a pulse for that pulse position which is registered in the delay line D1, through the and-circuit 15 to the wire *t*. This pulse now passes the and-circuit 107 because the not-circuit 106 is open. The bistable circuit 108 is triggered. A circuit is closed from the bistable circuit 108, through the wire *r*, and-circuit 14 of the indicated subscriber's line, to the not-circuit 12 which is blocked and through the wire *u*1 pertaining to the A-wire AF1, to the not-circuit 23 that is blocked. The signal also passes the and-circuit 21, because the memory BKM1 has registered the same pulse position as the memory AKM1 and a pulse arrives from the amplifier PL2. Through the wire *u*2 the signal is sent to the not-circuit 34 which is blocked. The signal passes the and-circuit 31 because a pulse is sent from the amplifier PL3 and the memory CKM1 has registered the same pulse position as the memories AKM1 and BKM1 as far as to the wire *u*3 and blocks the not-circuit 43. As the memory BKM3 of the contact BK3 has registered the same pulse position as the memories AKM1, BKM1 and CKM1, the signal is sent through the and-circuit 41 to the wire *u*4 and the not-circuit 52 of all individual contacts connected to the A-wire RF1. By blocking the not-circuits 12, 23, 34, 43 and 52 those impulses will be erased which are recorded in the memories AKM1, BKM1, CKM1, BKM3 and RKM1. The signal from the bistable circuit 108 passes the delay circuit *p*1 and the wire *d*1 to the wire *z* and the and-circuit 221 that is open, because the vertical stepping chain of the matrix RM is in position 1. The signal passes the or-circuit 231 and restores the bistable circuit 241, and from the wire *d*1 to the wire *z* and restores the bistable circuits 251 and 252 and 310. The current through the wire *b*1 is broken and the stepping chains of the matrixes IM and RM will start again. By restoring the bistable circuit 241, re-recording of the coordinates of the instrument A1 will be prevented when the stepping circuit 1B in the matrix RM is passed. At the same time the bistable circuit 108 is again operated by the delay circuit $p2$. Then the connection between the instrument A1 and the register REG1 is disconnected.

The function of the register REG1 is unessential to the invention and has therefore been wholly omitted. It is now supposed that the subscriber A2 sets the register REG1 by means of signals indicating the number of a called subscriber. When the register has received these signals, the marker M is called again. This occurs by breaking the circuit through the resistances $r7$, $r8$ for energization of the ferrite ring FR1. At the next reading out the ferrite ring FR1 is re-energized without then being again energized in that direction which indicates free or busy condition. At a second reading out, the bistable circuit 521 is therefore not triggered. The not-circuit 503 is not blocked and the signal through the wire $b2$ from the matrix LM passes the or-circuit 502 and blocks the not-circuit 501, the $x'$-chain in the matrixes LM and AM stopping on the stepping circuit 1. The current through the wire $b2$ and the not-circuit 503 passes the not-circuit 506 to the and-circuit 507 which opens so that the bistable circuits 451 and 450 are operated through the wire $a2$ by means of the and-circuits 461, 460. The coordinates of the register REG1 are marked in the and-circuits 461, 460 by means of the wires from the stepping circuits 1 and $y'$ in the stepping chains of the matrix AM. The bistable currents 451, 450 are triggered and the coordinates $x2$, $y2$ are marked. During the time delay in the delay circuit $p6$ the and-circuit 55 of the register REG1 is open when the pulse position of the connection connected to the register appears in the memory RKM1. As a result, the and-circuit 510 opens. A pulse is received from the amplifier PL7 through the not-circuit 52, the and-circuits 51, 55, to the wire $t1$, through the and-circuit 510 to the bistable circuit 500 that is triggered. From the and-circuit 500 a short impulse which is determined by the delay circuit $p8$ is sent to a disconnecting current through the wire $r$ and through the and-circuit 53 to the wire $u4$ and to the not-circuit 52. The pulse from the amplifier PL7 is stopped so that the recording in the memory RKM1 is erased. The signal passes through the wire $u4$ to the and-circuit 47. A simultaneous impulse from the amplifier PL6 opens the and-circuit 47, the signal thereby passing to the wire $u3$ and the not-circuit 43 that closes so that the recording in the memory BKM3 is erased. Through the wire $u3$ the signal is sent to the and-circuit 37 that is opened by a simultaneous impulse from the amplifier PL3, the not-circuit 34 being caused to erase the recording in the memory CKM1. Through the wire $u2$ a signal is fed to the and-circuit 25 which is opened by an impulse from the amplifier PL2. The not-circuit 23 erases the recording in the memory BKM1. The signal continues through the wire $u1$ to the not-circuit 12, the recording in the memory AKM1 being erased. The above described disconnection takes place before the delay circuit $p6$ closes the not-circuit 506 in FIG. 7. The following circuit is completed: the bistable circuit 441 and the stepping circuit 1 in the vertical chain of the matrix LM, the and-circuit 141, the wire $b2$, the not-circuit 503, the delay circuit $p6$, the not-circuit 508, the wire $z1$ to the bistable circuits 500, 451, 450 which are triggered. The indication of the coordinates $x2$, $y2$ of REG1 is disconnected. The wires $s$ and $r$ are released.

The register REG1 now indicates through the multiples E1 and E2 the coordinates $x$, $y$ and $x1$, $y1$, respectively, of the called and the calling subscriber. These are only shown for the subscriber's line L1 in FIG. 3, where they are found in the and-circuits 10 and 13.

When the delay circuit $p7$ becomes conductive the not-circuit 508 is closed and a circuit through the wire $a3$ opens the and-circuit 312 for pulses from the impulse generator PG. The stepping chain 1, 2 . . . $n$ is started. The A-wire of the called and the calling line is marked on respective wires $x1$ in FIG. 3 in a circuit through the or-circuit 17 and the pulse positions of the A-wires are indicated on the wire $s$ through the and-circuit 16, in the same manner as during the selection of registers. Selection and recording occur in conformity with the description above for the connection A1–REG1. However, the memory of the called line receives the write-impulse from the wire $i1$ through the and-circuit 10 while the calling subscriber receives the write-impulse through the and-circuit 13.

When the communication has been set up, the bistable circuits 315 in FIG. 5 will be operated as before. The wire $z$ is energized through the and-circuits 316 and 314, the marker being released. As a result, the bistable circuit 441 is restored, whereby re-recording of the coordinates $x2$, $y2$ of the register REG1 in the matrix LM is prevented when the horizontal chain of the matrix passes the stepping circuit 1B.

We claim:

1. In an automatic telephone exchange of the kind including conductors each capable of simultaneously transmitting several voice connections up to a predetermined maximum number and also including a pulse sender sending regularly repeated trains of short current pulses, each train being composed of a number of pulses corresponding to said maximum number, each voice connection being closed through one of said conductors only when a pulse has a predetermined pulse position in each of said trains in the sequence of pulse trains appearing during a voice connection; several groups of lines and a primary conductor common to each group of lines; an individual switch contact for each line in said groups, said switch contacts, during a voice connection, connecting the respective line to the primary conductor of the respective group during intervals of time corresponding to the pulses of the voice connection; a primary memory means for each individual switch contact controlling the make and break of the switch contact in time relationship with the pulses of the voice connection connected to the line associated with the respective switch contact; a marking means for setting up voice connections between said lines through said conductors, said voice connections being set up in circuits including said individual switch contacts and said primary conductors, said primary conductors being grouped in primary groups; a plurality of secondary conductors allocated to each of said primary groups, each of said secondary conductors being capable of transmitting a plurality of simultaneously set up voice connections under the control of the pulses sent by said pulse sender; secondary switch contacts for connecting each of said secondary conductors to a primary conductor within the respective primary group and other secondary switch contacts for connecting a secondary conductor allocated to one primary group to at least one secondary conductor allocated to another primary group; a second memory means for each of said secondary switch contacts controlling the make and break of the respective secondary switch contact in time relationship with the time pulses of every voice connection the circuit of which includes secondary switch contacts, said marking means when setting up a voice connection between two lines through a primary conductor in one primary group and a primary conductor in another primary group first selecting in said trains of short pulses a pulse position free for both said primary conductors and simultaneously free for two secondary conductors allocated to one of each of said primary groups and joined by one of said other secondary switch contacts, said selected secondary conductors being connected together and to the respective primary conductors across the corresponding secondary switch contacts and then setting the memory means for said individual switch contacts and the memory means allocated to said secondary switch contacts controlling the make and break of the respective switch contacts in timed relationship with the pulses in said selected pulse position.

2. An automatic telephone exchange according to claim 1 wherein said secondary switch contacts connect two secondary conductors allocated to the same primary group to set up connections between lines to which individual switch contacts are allocated and which are connected to the same primary conductor.

References Cited in the file of this patent

UNITED STATES PATENTS

| | | |
|---|---|---|
| 2,876,284 | Harris | Mar. 3, 1959 |
| 2,890,286 | Flood | June 9, 1959 |
| 2,910,540 | Van Mierlo et al. | Oct. 27, 1959 |
| 2,910,542 | Harris | Oct. 27, 1959 |